United States Patent [19]

Goes

[11] 4,136,755
[45] Jan. 30, 1979

[54] LOUDSPEAKER SYSTEM FOR A VEHICLE

[75] Inventor: Friedrich Goes, Wolfsburg, Fed. Rep. of Germany

[73] Assignee: Volkswagenwerk Aktiengesellschaft, Wolfsburg, Fed. Rep. of Germany

[21] Appl. No.: 784,279

[22] Filed: Apr. 4, 1977

[30] Foreign Application Priority Data

Apr. 17, 1976 [DE] Fed. Rep. of Germany ....... 2617068

[51] Int. Cl.² .......................... G10K 10/00; H05K 5/00
[52] U.S. Cl. .................................. 181/141; 181/145; 181/146; 181/151; 181/199
[58] Field of Search ............ 181/141, 144–146, 181/148, 150, 151, 153–156, 198, 199; 180/90; 296/24 R; 179/1 VE, 1 GA, 1 E, 1 G

[56] References Cited

U.S. PATENT DOCUMENTS 3,397,286  8/1968  Prewitt et al. .................... 179/1 VE

*Primary Examiner*—L. T. Hix
*Assistant Examiner*—Benjamin R. Fuller
*Attorney, Agent, or Firm*—Brumbaugh, Graves, Donohue & Raymond

[57] ABSTRACT

A loudspeaker system for the passenger compartment of a vehicle, such as an automobile, is disclosed. The system has at least two loudspeakers arranged on opposite sides of the passenger compartment in the end regions of a rigid, hollow support element which is closed on all sides and extends across substantially the entire width of the passenger compartment. This hollow support element is at least partially filled with sound absorbing material.

7 Claims, 5 Drawing Figures

LOUDSPEAKER SYSTEM FOR A VEHICLE

BACKGROUND OF THE INVENTION

The present invention relates to a loudspeaker system for the passenger compartment of a vehicle, such as an automobile, in which at least two speakers are arranged in the passenger compartment to provide sources of sound on opposite sides thereof.

It is known to provide motor vehicles with loudspeaker systems in which separate speakers are arranged on opposite sides of the vehicle passenger compartment. One system of this type is disclosed, for example, in the West German patent publication (Offenlegungsschift) No. 2,402,028. As is well known, multiple speakers arranged at various corners of a passenger compartment serve either to create the impression of stereophonic sound or to improve the quality of tone for the passengers sitting close to the individual speaker locations.

The quality of sound reproduction in motor vehicles is determined primarily by the nature and quality of the individual speakers. However, even when high quality speakers are used, it is difficult to reproduce the lower audio frequencies because of the limited, closed space conditions within the passenger compartment. In order to remedy this problem, it is known, for example from the German Utility Model patent No. 7,442,448 to de-emphasize the reproduction of the medium and high audio frequencies.

Low frequency audio reproduction may also be improved by providing an acoustic baffle of the required dimensions. If the speakers are arranged in "boxes" or enclosures filled with sound attenuating material, they will radiate sound with a lower cutoff frequency, as is required for realistic tonal characteristics. However, speaker systems constructed in accordance with this known principle have had such a large total volume that they have not been considered practical for use in motor vehicles.

It is an object of the present invention to improve the quality of sound reproduction in the passenger compartment of a vehicle, such as an automobile.

SUMMARY OF THE INVENTION

This object, as well as other objects which will become apparent in the discussion that follows, are achieved, according to the present invention, by providing a rigid, hollow support element or beam within the vehicle from one side of the passenger compartment to the other. This hollow support element is closed on all sides but has openings at its end regions for receiving the loudspeakers. The hollow support element is at least partially filled with sound absorbing material, such as foam plastic.

The rigid hollow support element thus effectively forms a speaker housing while taking maximum advantage of the space available in the passenger compartment. Even if no partitions are provided along the length of the hollow support element, the sound produced by the two speakers is separated due to the sound absorbing material that fills the hollow space.

In many cases, particularly where the hollow support element is used for purposes other than as a loudspeaker enclosure, it is useful to provide it with at least one rigid partition arranged in its mid-region. If several partitions are present, it is sufficient if the sound absorbing material is provided only in the spaces within the support element which lie outside the outermost partitions; i.e., the spaces immediately adjacent to the loudspeakers.

As indicated above, the hollow support element according to the invention may be advantageously used on a vehicle for purposes other than its primary purpose as a loudspeaker enclosure. For example, the support element may constitute a supporting component of the vehicle instrument panel or dashboard. It may also be fixed to the lower edge of the dashboard and designed in a suitable manner to constitute a shelf or tray. In cases where it is used on a vehicle having a passive restraining system comprising a "knee bar", the hollow support element may be arranged at a location in front of the knees of the vehicle passengers to form the knee bar. Finally, when used in an automobile having a rear trunk, the hollow support element may constitute a component of a trunk cover behind the rear passenger seat.

For a better understanding of the present invention, together with other and further objects thereof, reference is made to the following description, taken in conjunction with the accompanying drawings, and its scope will be pointed out in the appended claims.

DESCRIPTION OF THE PREFERRED EMBODIMENTS

Figure 1:
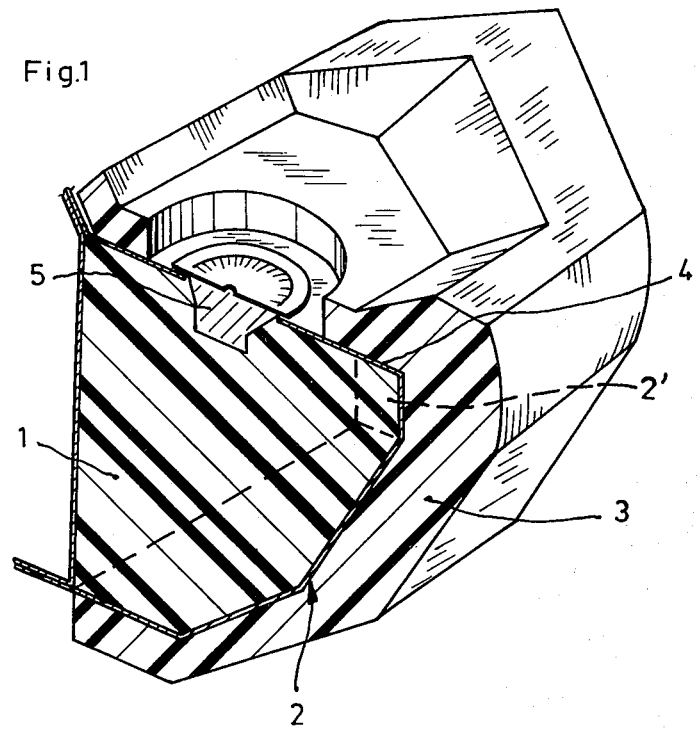
FIG. 1 is a perspective, cut-away view of a portion of a loudspeaker system according to the present invention which is designed to serve as a "knee bar" in an automobile.

FIG. 1 illustrates the right hand end (as seen in the direction of travel) of a speaker enclosure according to the present invention formed as a knee bar for a passive passenger restraining system in a motor vehicle. The enclosure essentially consists of a hollow beam or support element 2 which comprises side wall 2' and is designed for attachment in the passenger compartment of a motor vehicle at a location in front of the knees of the vehicle passengers. The space defined by the hollow support element is enclosed on all sides and filled with a sound absorbing material 1 such as foam plastic.

If desired, the hollow support element 2 may be provided with a resilient covering 3, in a manner well known in the art, as a cushion against impact by the vehicle passengers. The upper wall 4 of the hollow support element is provided with a recess in the region of each end for receiving a loudspeaker 5 which, as shown in FIG. 1, projects into the interior of the element. The speaker 5 is fastened to the upper wall 4 in a conventional manner and may be covered by a decorative grille or the like.

It will be understood that the left end (as seen in the direction of travel) of the hollow support element 2 is also provided with a speaker 5 in a manner identical to that shown in FIG. 1. Thus, the loudspeaker system, including the enclosure formed by the hollow support element 2 and the several speakers as are required for stereophonic high fidelity sound is installed on a vehicle as a knee bar and takes up practically no additional space.

Figure 3:
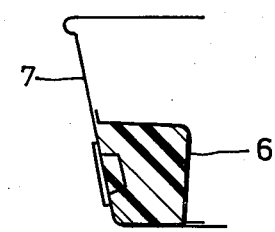
FIG. 3 is a diagrammatic cross-sectional view of the loudspeaker enclosure according to the present invention forming a supporting component of an automobile instrument panel.

FIG. 3 illustrates another space-saving arrangement wherein a hollow support element 6, filled with sound absorbing material, constitutes a supporting component of a dashboard or instrument panel 7. The usual instruments, switches and the like, as well as the terminals therefore, may be arranged on the instrument panel in the conventional manner in the region above the hollow support element 6.

Figure 2:
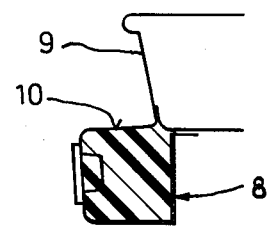
FIG. 2 is a diagrammatic, cross-sectional view of the loudspeaker enclosure according to the present invention attached to the lower edge of an automobile instrument panel.

In the embodiment illustrated in FIG. 2, a hollow support element 8, which is also closed on all sides and filled with sound absorbing material, is joined to a dashboard or instrument panel 9 in such a way that it extends outward from the dashboard forming a shelf 10 at approximately the height of the passenger's knees.

Figure 4:
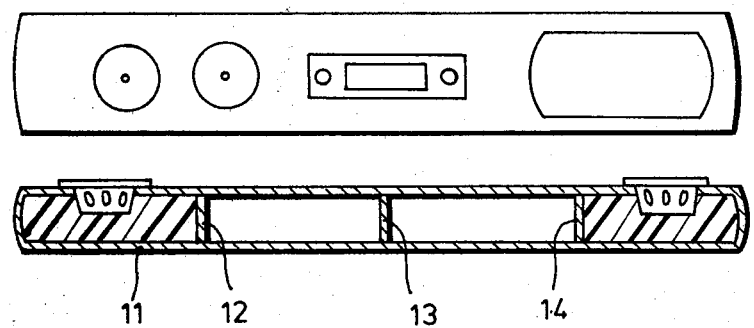
FIG. 4 is a cross-sectional view of the loudspeaker enclosure according to the present invention employed as a knee bar in an automobile.

FIG. 4 illustrates the "knee bar" embodiment of the loudspeaker system according to the present invention in which three rigid partitions 12, 13 and 14 are arranged in the mid-region of the hollow support element 11, between the end regions which hold the loudspeakers. As may be seen, only the spaces inside the hollow support element which are outside the outermost partitions are filled with sound absorbing material.

Figure 5:
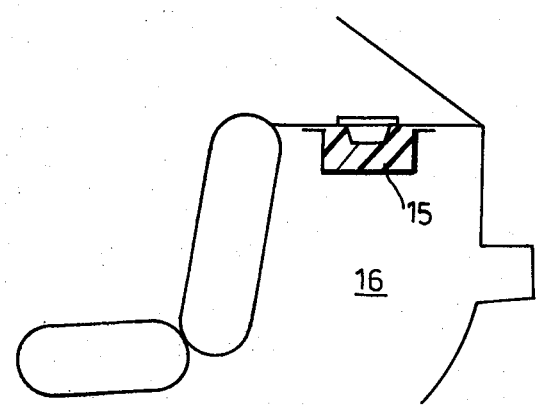
FIG. 5 is a diagrammatic cross-sectional view of the loudspeaker enclosure according to the present invention employed as a cover for an automobile trunk.

FIG. 5 illustrates an embodiment in which the hollow support element 15 is located between the passenger compartment and the trunk space 16 of a vehicle, thus forming a covering for the trunk space.

In all the embodiments described above, the loudspeakers which are arranged on opposite sides of the vehicle are separated by the maximum distance and are acoustically insulated from each other. Notwithstanding these advantages, the loudspeaker system according to the present invention takes up practically no additional space in the vehicle because the hollow support element forms a structural member of a vehicle component which is otherwise provided.

It will be understood that the above-described embodiments are merely exemplary and that persons skilled in the art may make many variations and modifications thereto without departing from the spirit and scope of the invention. All such variations and modifications are intended to be included within the scope of the invention as defined in the appended claims.

I claim:

1. In a loudspeaker system for the passenger compartment of a vehicle, such as an automobile, having at least two loudspeakers arranged on opposite sides of the passenger compartment, the improvement comprising a rigid, hollow support element adapted for arrangement within the passenger compartment of the vehicle, wherein said hollow support element has a lengthwise dimension, measured in the direction of the spacing between the loudspeakers, which is substantially equal to the width of the passenger compartment; wherein said hollow support element is closed on all sides and has openings in the end regions thereof for receiving the loudspeakers; and wherein said hollow support element is at least partially filled with sound absorbing material.

2. The improvement defined in claim 1, wherein said hollow support element includes at least one rigid partition arranged in its mid-region between said end regions.

3. The improvement defined in claim 2, wherein said hollow support element includes a plurality of rigid partitions in its mid-region, and wherein the only spaces inside said hollow support element which lie outside the outermost partitions are filled with sound absorbing material.

4. The improvement defined in claim 1, wherein said hollow support element is arranged within a vehicle having an instrument panel, and wherein said hollow support element constitutes a supporting component of said instrument panel.

5. The improvement defined in claim 1, wherein said hollow support element is arranged within a vehicle having an instrument panel, and wherein said hollow support element is fastened to the lower edge of the instrument panel.

6. The arrangement defined in claim 1, wherein said hollow support element is arranged within the passenger compartment of a vehicle at a location in front of the knees of the vehicle passengers, whereby said hollow support element forms a component of a passive restraining system comprising a knee bar.

7. The improvement defined in claim 1, wherein said hollow support element is arranged in a vehicle having a passenger compartment and a trunk space, said hollow support element being located between said passenger compartment and said trunk space and forming a covering for said trunk space.

* * * * *